United States Patent [19]

Wohlrab

[11] 4,005,934
[45] Feb. 1, 1977

[54] APPARATUS FOR EXECUTING LIGHT CONTROL OPERATIONS IN A BIDIRECTIONAL FILM PRINTER

[75] Inventor: Hans Chr Wohlrab, North Hollywood, Calif.

[73] Assignee: PSC Technology Inc., Glendale, Calif.

[22] Filed: Mar. 14, 1975

[21] Appl. No.: 558,536

[52] U.S. Cl. .................................. 355/88; 355/35; 355/36
[51] Int. Cl.[2] .......................................... G03B 27/04
[58] Field of Search ................. 355/32, 35, 36, 38, 355/68, 81, 88

[56] References Cited
UNITED STATES PATENTS

| | | | |
|---|---|---|---|
| 3,502,409 | 3/1970 | Balint et al. | 355/36 |
| 3,519,347 | 7/1970 | Bowker et al. | 355/68 X |
| 3,552,852 | 1/1971 | Stemke et al. | 355/35 |
| 3,600,089 | 8/1971 | Walter | 355/40 X |
| 3,716,299 | 2/1973 | Balint | 355/88 X |

*Primary Examiner*—Fred L. Braun
*Attorney, Agent, or Firm*—Christie, Parker & Hale

[57] ABSTRACT

Color corrections are executed in a bidirectional film printer responsive to units of color correction information arranged on a data storage tape in the sequence in which the color corrections are to be made in the forward direction of film transport. Units of frame count information each representing the frame at which a color correction is to be made are interleaved with the color corrections on the tape in the sequence in which the color corrections are to be made in the forward direction. One color correction and one frame count at a time are retrieved in pairs; the same pairs are retrieved in both directions of film transport. The frames of the master film are counted during transport and compared with the frame count retrieved from the tape to provide the frame indications at which the color corrections are to be made in the forward direction of film transport. A cue signal to execute each color correction is generated responsive to the corresponding frame indication during film transport in the forward direction. During film transport in the reverse direction, a cue signal to execute each color correction is generated responsive to the frame indication corresponding to the next subsequent color correction in the order of the sequence. The transmission of the color correction information to light valves is delayed one cycle in the reverse direction of film transport relative to the forward direction. The frame counts are each referenced to the same point at the beginning of the master film, the frames are continuously counted from this reference point in both directions of film transport, film transport in the forward direction is stopped responsive to an indication on the tape, and film transport in the reverse direction is stopped when the count indicates the reference point at the beginning of the master film is reached.

14 Claims, 7 Drawing Figures

APPARATUS FOR EXECUTING LIGHT CONTROL OPERATIONS IN A BIDIRECTIONAL FILM PRINTER

BACKGROUND OF THE INVENTION

This invention relates to film printers and, more particularly, to apparatus for executing light control operations during bidirectional film transport in a printer.

Film printers are employed to expose a reel of raw film to the frames of photographic images on a reel of master film while the master film and raw film are transported together. Light control operations are commonly executed during the exposure process in high quality film copying operations. For example, red, green, and blue color corrections are made by so-called light valves at the beginning of each scene of the master film to compensate for the different lighting conditions under which the master film was produced and different film characteristics. In order to have one scene fade out and/or the next scene fade in, a fade is executed by gradually changing the intensity of the exposing light on a frame by frame basis.

Notches or RF strips on the film have been used for many years to mark the frames at which light control operations such as color corrections are to be executed. The color corrections are stored on a punched paper tape in the sequence in which they are to be made during film transport. Each time a notch or RF strip is sensed during film transport, the corresponding color correction is read from the tape and made by the light valves. The use of notches or RF strips to mark the master film is objectionable because the master film must be handled to so mark it, and, in the case of RF strips, the strips may come off the film.

Recently the technique of frame count cuing has been developed to indicate the frames at which light control operations are to be executed without marking the master film. The frames of the master film are counted during transport. The frame counts at which the light control operations are to be executed are stored on the tape with the corresponding color corrections. The frame counts on the tape are compared with the actual frame count of the master film during transport to generate cue signals that execute the color corrections at the coincidence of both.

SUMMARY OF THE INVENTION

The present invention concerns apparatus for use with a film printer that executes light control operations during bidirectional transport of a master film and a raw film to transfer to the raw film frames of photographic images on the master film. Units of light control information each representing a light control operation to be executed during printing are arranged in a data storage device in the sequence in which the operations are to be executed in one direction of film transport. Means are provided to indicate the frames of the master film at which the light control operations are to be executed in the one direction of film transport. One frame indication corresponds to each light control operation to be executed in the one direction of film transport. During film transport in the one direction, a cue signal is generated to execute each light control operation responsive to the corresponding frame indication. Each unit of light control information is retrieved from the data storage device in the order of the sequence during film transport in the one direction upon generation of the cue signal to execute the light control operation represented by such unit. During film transport in the other direction, a cue signal is generated to execute each light control operation responsive to the frame indication corresponding to the next subsequent light control operation in the order of the sequence. Each unit of light control information is retrieved from the data storage device in the reverse order of the sequence during film transport in the other direction upon generation of the cue signal to execute the light control operation represented by such unit.

Preferably, units of frame count information each representing the frame at which a light control operation is to be executed during printing are arranged in the data storage device in the sequence in which the light control operations are to be executed in the one direction of transport. The frames at which light control operations are to be executed are indicated by counting the frames of the master film during film transport, retrieving each unit of frame count information from the data storage device in the order of the sequence during film transport in the one direction, and retrieving each unit of frame count information from the data storage device in the reverse order of the sequence during film transport in the other direction. To generate the cue signals, the frames of the master film counted during film transport are compared with the retrieved units of frame count information.

A feature of the invention is the storage of the units of light control information and the units of frame count information in the same data storage device such that the individual units of frame count information are interleaved with the individual units of light control information, and retrieving each unit of light control information with a unit of frame count information in a pair, such that the same pairs are retrieved during film transport in the one direction and the other direction. During film transport in the other direction, transmission of each unit of light control information is delayed relative to its transmission in the one direction of film transport.

According to another feature of the invention in which the units of frame count information each represent a frame referenced to the same point at one end of the master film and the frames of the master film are counted up and down continuously from the same reference point in both directions of film transport, film transport at the same end of the master film as the reference point is stopped when the count indicates the reference point on the master film is reached.

BRIEF DESCRIPTION OF THE DRAWINGS

The features of a specific embodiment of the best mode contemplated of carrying out the invention are illustrated in the drawings, in which.

DETAILED DESCRIPTION OF THE SPECIFIC EMBODIMENT

Figure 1:
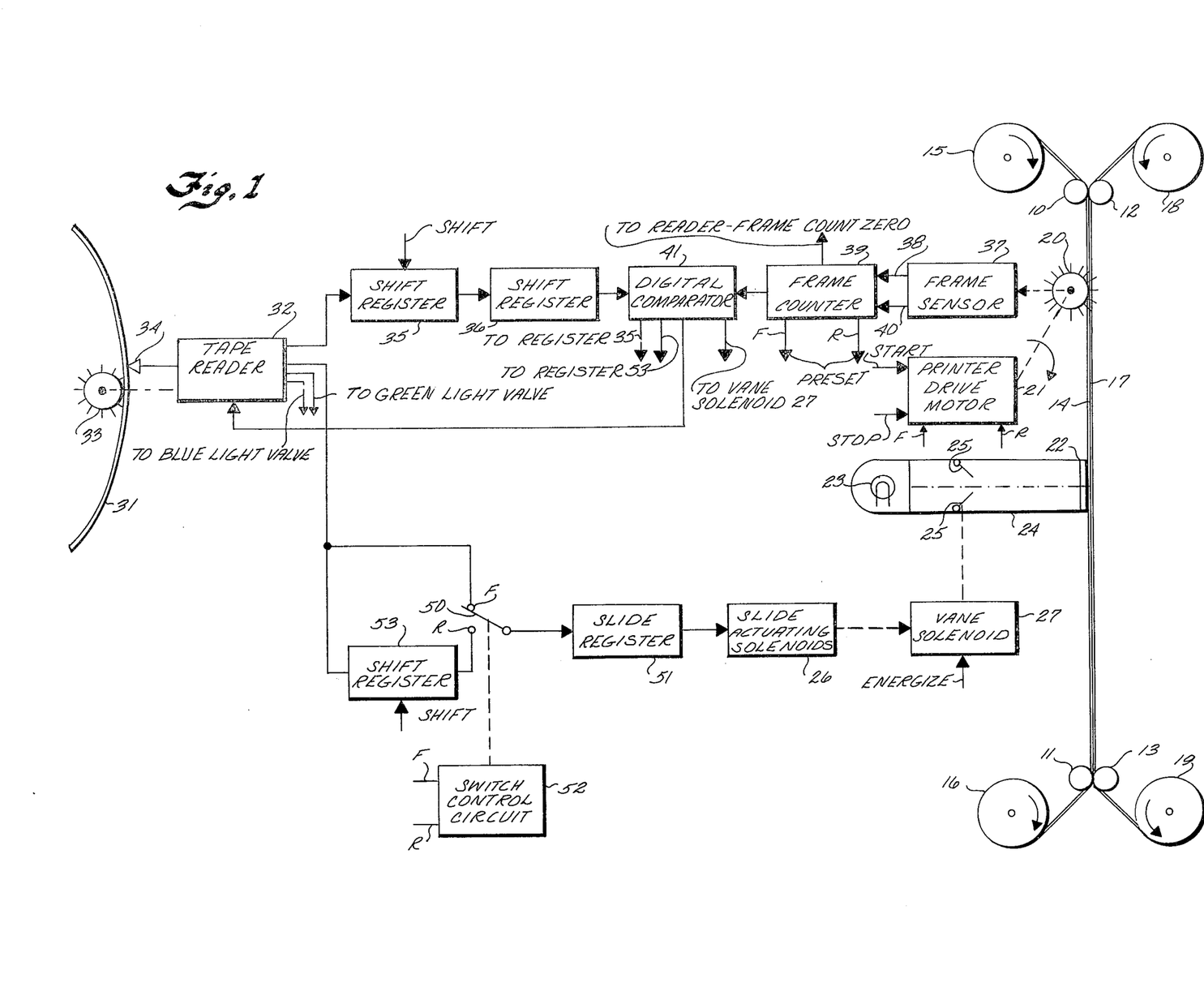
FIG. 1 is a schematic diagram of a bidirectional film printer with apparatus that executes color corrections in accordance with the principles of the invention.

In FIG. 1 a contact film printer has a master film guiding system including guide rollers 10 and 11 and a raw film guiding system including guide rollers 12 and 13. A length of master film 14 to be copied extends from a supply reel 15 across guide rollers 10 and 11 to a take-up reel 16. A length of raw film 17 to be exposed to the frames of photographic images on master film 14 extends from a supply reel 18 across guide rollers 12 and 13 to a take-up reel 19. Master film 14 and raw film 17 have sprocket holes that engage sprockets in a sprocket wheel 20. A bidirectional printer drive motor 21 is coupled by a shaft to sprocket wheel 20 to drive master film 14 and raw film 17 in contact with each other across an exposure aperture 22. As master film 14 and raw film 17 pass exposure aperture 22 in contact with each other, raw film 17 is exposed to the images on master film 14 in the presence of light from a light source 23.

The invention concerns the execution of light control operations during the exposure process, such as color corrections or fades. For the purpose of discussion, it is assumed that the light control operations are color corrections made in the manner described in A. Balint et al U.S. Pat. No. 3,502,409, issued Mar. 24, 1970, the disclosure of which is incorporated herein by reference. Briefly, light from a light source is split into the component colors blue, green, and red by dichroic mirrors, the three light components are transmitted through so-called light valves to adjust the proportional intensity of each color component, the adjusted color components are recombined, and the recombined color adjusted light is projected through exposure aperture 22 onto master film 14 and raw film 17. One of the light valves, i.e. the red light valve, is represented at 24. For simplicity, the light splitting and recombining dichroic mirrors and the other light valves are not shown. The intensity of the color component passing through light valve 24 is adjusted by positioning vanes 25. As described in U.S. Pat. No. 3,502,409, each light valve includes a bar type adder unit having a plurality of solenoid actuated slides. Binary signals representing the color correction are coupled to slide actuating solenoids 26, thereby causing the adder unit to expand linearly by an amount depending upon which of slide actuating solenoids 26 have been actuated. This linear expansion is converted into an angular rotation by a vane memory. The angular position of the vane memory is then sampled by energizing a vane solenoid 27, which in turn moves vanes 25 into the path of the color component an amount determined by the angular position of the vane memory. Thus, the operation of light valve 24 involves a two-step procedure — the vane position is set up in the vane memory by actuating some combination of slide actuating solenoids 26 and then the angular position of the vane memory is transferred to vanes 25 upon energization of vane solenoid 27.

Color correction information and frame count information are stored on a punched paper tape 31. A tape reader 32, described in detail below in connection with FIG. 3, includes a tape transport motor (not shown in FIG. 1) that drives a sprocket wheel 33. Sprocket wheel 33 engages sprocket holes in a drive track on tape 31 to transport tape 31 past a mechanical or optical reading head 34 associated with tape reader 32.

Figure 2:
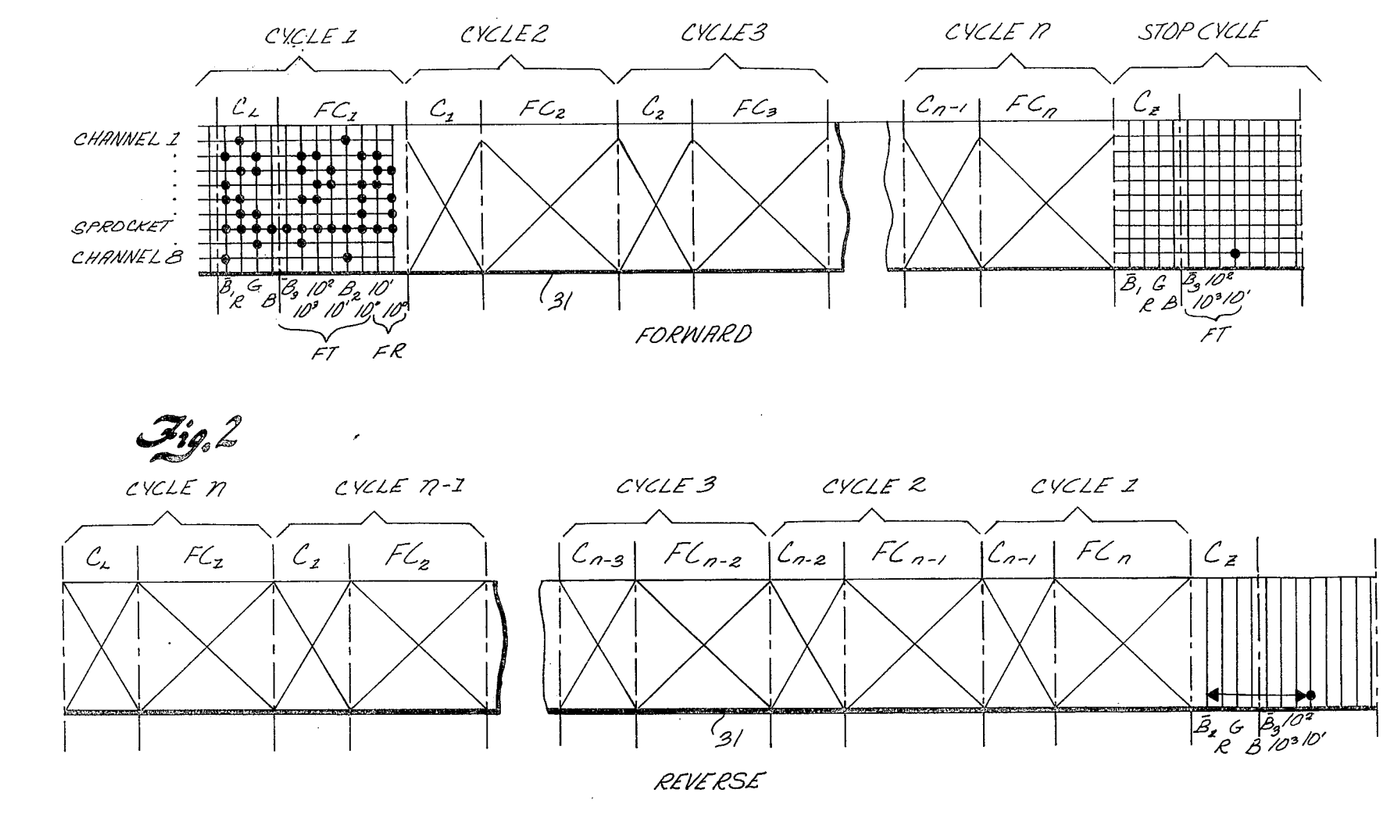
FIG. 2 is a diagram depicting the arrangement of units of color correction information and frame count information on a punched paper tape and the reading cycles of such tape for both directions of film transport.

Reference is made to FIG. 2 for a description of the format in which the color correction inforamation and frame count information are arranged on tape 31. As indicated in FIG. 2, tape 31 has channels 1 through 8 parallel to its length and a channel of sprocket holes at regular intervals which engage the sprockets of sprocket wheel 33. Channel 8 has one punched hole at either end of tape 31, called an 8-hole because it is in channel 8, to control the initiation of the printing operation in each direction of film transport. Between the two 8-holes at either end of tape 31 there are no holes in channel 8. Channels 1 through 6 are selectively punched to represent the binary values of the color correction and frame count information stored thereon. (The information stored in channel 7 controls the fade operations, which are not described herein.) Units of color correction information are stored on the areas of tape 31, designated $C_1$ in the order of the prescribed color corrections. The subscripts represent the number of the scene in which the corresponding color correction is to be made counting from the beginning of master film 14, e.g. $C_3$ is the area in which the color correction information for scene 3 is stored. $C_L$ designates the area of tape 31 in which the color correction information for the leader of master film 14 is stored. $C_z$ designates the area of tape 31 in which the zero cut information is stored. The zero cut information closes the vanes completely at the end of the printing operation, thereby preventing any light from passing through exposure aperture 22 to master film 14 and raw film 17. Units of frame count information are stored on the areas of tape 31, designated FC, and identify the number of frames from the beginning of master film 14 at which the respective scenes begin; the subscripts represent the number of the scene to which the respective frame count corresponds, e.g. $FC_3$ is the area in which the frame count of the beginning of scene 3 is stored. There are a total of $n$-1 scenes on master film 14. $FC_n$ designates the frame count following the end of the last scene, i.e., scene $n$-1, which is the point at which the zero cut is executed. During film transport in the reverse direction, i.e., from end to beginning of master film 14, to provide the proper sequence for executing the prescribed color corrections, color correction $C_i$ is made at frame count $FC_{i+1}$, where $i$ is the scene in question, counting from the beginning of master film 14, e.g., color correction $C_2$ is made at frame count $FC_3$. During film transport in the forward direction, i.e., from beginning to end of master film 14, to provide the proper sequence for executing the prescribed color corrections, color correction $C_i$ is made at frame count $FC_i$, where $i$ is the scene in question counting from the beginning of master film 14, because the beginning of each scene passes aperture 22 before the end of such scene; e.g. color correction $C_2$ is made at frame count $FC_2$.

As illustrated in connection with area $C_L$, each unit of color correction information on tape 31 has four character positions or transverse rows of holes designated $\overline{B}_1$, R, G, and B moving from the beginning of tape 31. The eight hole at the beginning of tape 31 is stored in character position $\overline{B}_1$, the vane setting for the red light valve is stored in character position R, the vane setting for the green light valve is stored in character position G, and the vane setting for the blue light valve is stored in character position B. With the exception of area $C_L$ no information is stored in character position $\overline{B}_1$.

As illustrated in connection with area $FC_1$, each unit of frame count information on tape 31 has eight character positions or transverse rows of holes. Assuming master film 14 is 35 mm, there are 16 frames per foot of film length, the frame count is from 0 to 15 frames and from 0 to 9,999 feet. Moving toward the beginning of tape 31, within the bracket labeled FR, a binary decimal number of the first, i.e. lowest order digit place of the frame, is stored in the character position designated $10^0$ and the binary decimal number of the second order digit place of the frame is stored in the character position designated $10^1$. Within the bracket labeled FT, the binary decimal number of the first, i.e. lowest order digit place of the foot count, is stored in the character position designated $10^0$; nothing is stored in the character position designated $\overline{B}_2$, the binary decimal number of the second order digit place of the foot count is stored in the character position designated $10^1$, the binary coded decimal number of the third order digit place of the foot count is stored in the character position designated $10^2$; the binary coded decimal number of the third order digit place of the foot count is stored in the character position designated $10^3$; and nothing is stored in the character position designated $\overline{B}_3$.

During each reading cycle of tape 31, one unit of color correction information and one unit of frame count information are read as a pair; the same pairs are read during both directions of film transport. The top of FIG. 2 represents the reading cycles of tape 31 during film transport in the forward direction. As illustrated, the color correction for the leader and the frame count of the beginning of scene 1 are read during the first reading cycle; the color correction for scene 1 and the frame count of the beginning of scene 2 are read during the second reading cycle; the color correction for the last scene and the frame count following the end of the last scene are read during the $n$th cycle; and the zero cut and an eight hole in the following character position $10^1$ of the foot count are read during the stop cycle, which terminates reading of tape 31 during film transport in the forward direction.

The bottom of FIG. 2 represents the reading cycles of tape 31 during film transport in the reverse direction. As illustrated, the eight hole in character position $10^1$ of the foot count is first read to initiate the first cycle; the color correction for the last scene and the frame count following the end of the last scene are read during the first cycle; the color correction for scene 1 and the frame count of the beginning of scene 2 are read during the $n$-1st cycle; and the color correction for the leader and the frame count of the beginning of scene 1 are read during the $n$th cycle. As explained below in connection with FIG. 3, film transport in the reverse direction is not stopped responsive to the information stored on tape 31. Therefore, the last reading cycle is not designated the stop cycle.

In summary, the units of color correction information are arranged on tape 31 in the sequence in which the color corrections are to be executed in the forward direction of film transport; the units of frame count information at which the color corrections are to be made during film transport in the forward direction are arranged on tape 31 in the sequence in which the color corrections are to be made and are interleaved with the individual units of color correction information; during film transport in the forward direction, the units of color correction information and the units of frame count information are retrieved in pairs, in the order of the sequence, i.e., reading tape 31 from left to right in FIG. 2; and during film transport in the reverse direction, the units of color correction information and the units of frame count information are retrieved in the same pairs, in the reverse order of the sequence, i.e., reading tape 31 from right to left in FIG. 2.

The units of frame count information read from tape 31 during successive reading cycles are coupled by reader 32 to a shift register 35. The units of frame count information stored in register 35 are shifted in succession to a shift register 36 each time a new unit of frame count information is coupled to shift register 35 from reader 32. A frame sensor 37 described below in detail in connection with FIGS. 6 and 7, transmits a pulse over a lead 38 to a frame counter 39 each time a frame of master film 14 passes exposure aperture 22 in the forward direction of film transport. Each time a frame of master film 14 passes exposure aperture 22 in the reverse direction of film transport, frame sensor 37 transmits a pulse to frame counter 39 over a lead 40. Frame counter 39 counts up responsive to the pulses on lead 38 and counts down responsive to the pulses on lead 40. In summary, the state of frame counter 39 continuously reflects the frame of master film 14 passing exposure aperture 22 relative to the same reference point on master film 14 at all times during both direction of film transport. Register 36 and frame counter 39 are coupled to a digital comparator 41, which generates a cue signal to execute each color correction at the proper time during film transport, namely, when the state of frame counter 39 is identical to the frame count stored in register 36.

The units of color correction information read from tape 31 during successive reading cycles are coupled by reader 32 to the corresponding light valves. In the case of light valve 24, the red color correction character information is directly coupled through a contact F of a switch 50 to a slide register 51 during film transport in the forward direction. Slide actuating solenoids 26 are actuated responsive to the red color correction character information stored in register 51 to position the slides of light valve 24. Switch 50 is controlled by a switch control circuit 52. During film transport in the reverse direction, the red color correction character information is first coupled to a shift register 53. The units of color correction character information stored in shift register 53 are shifted in succession through a contact R of switch 50 to slide register 51 each time a new unit of color correction character information is coupled to shift register 53 by tape reader 32. In summary, during film transport in both directions, immediately before a color correction is to be made, the color correction information is stored in slide register 51 and the corresponding slide registers for the other light valves, so that the slides of the light valves are set to transfer the desired light correction into the vanes and the frame count at which such color correction is to be made is stored in shift register 36 for comparison with the state of frame counter 39.

As illustrated at the top of FIG. 2, during each reading cycle in the forward direction of film transport, reader 32 retrieves the color correction information for a scene and the frame count of the beginning of the next scene, e.g., during the second cycle, clor correction $C_1$ and frame count $FC_2$ are retrieved. Thus, shift register 35 serves to store each frame count until its corresponding color correction is retrieved in the next reading cycle.

As illustrated at the bottom of FIG. 2, during each reading cycle in the reverse direction of film transport, reader 32 retrieves the color correction information for a scene and the frame count at which such color correction is to be made, i.e., the frame count at the beginning of the next scene, e.g., during the second cycle, color correction $C_{n-1}$ and frame count $FC_n$ are retrieved. Thus, shift register 35 is unnecessary and its affect is nullified by shift register 53. It is to be understood by those skilled in the art that the arrangement of shift registers in the frame count information transmission path to digital comparator 41 and the color correction information transmission paths to the slide registers during film transport in the forward and reverse directions depends upon which pair of units of color correction information and frame count information are retrieved together.

When the state of frame counter 39 matches the frame count stored in register 36, digital comparator 41 generates a cue signal to energize vane solenoid 27, thereby executing the color correction, to shift the information in shift register 35 to shift register 36, to initiate another reading cycle in tape reader 32, and, during film transport in the reverse direction, to shift the information in shift register 53 to slide register 51. The cue signal generated by comparator 41 and the units of color correction information are supplied to the light valves in the proper sequence for executing the prescribed color corrections during film transport in both directions. In other words, during film transport in both directions, the desired color corrections are made at the proper frames of the master film, namely, at the beginning of the corresponding scene during forward film transport and at the end of the corresponding scene during reverse film transport.

Figure 3:
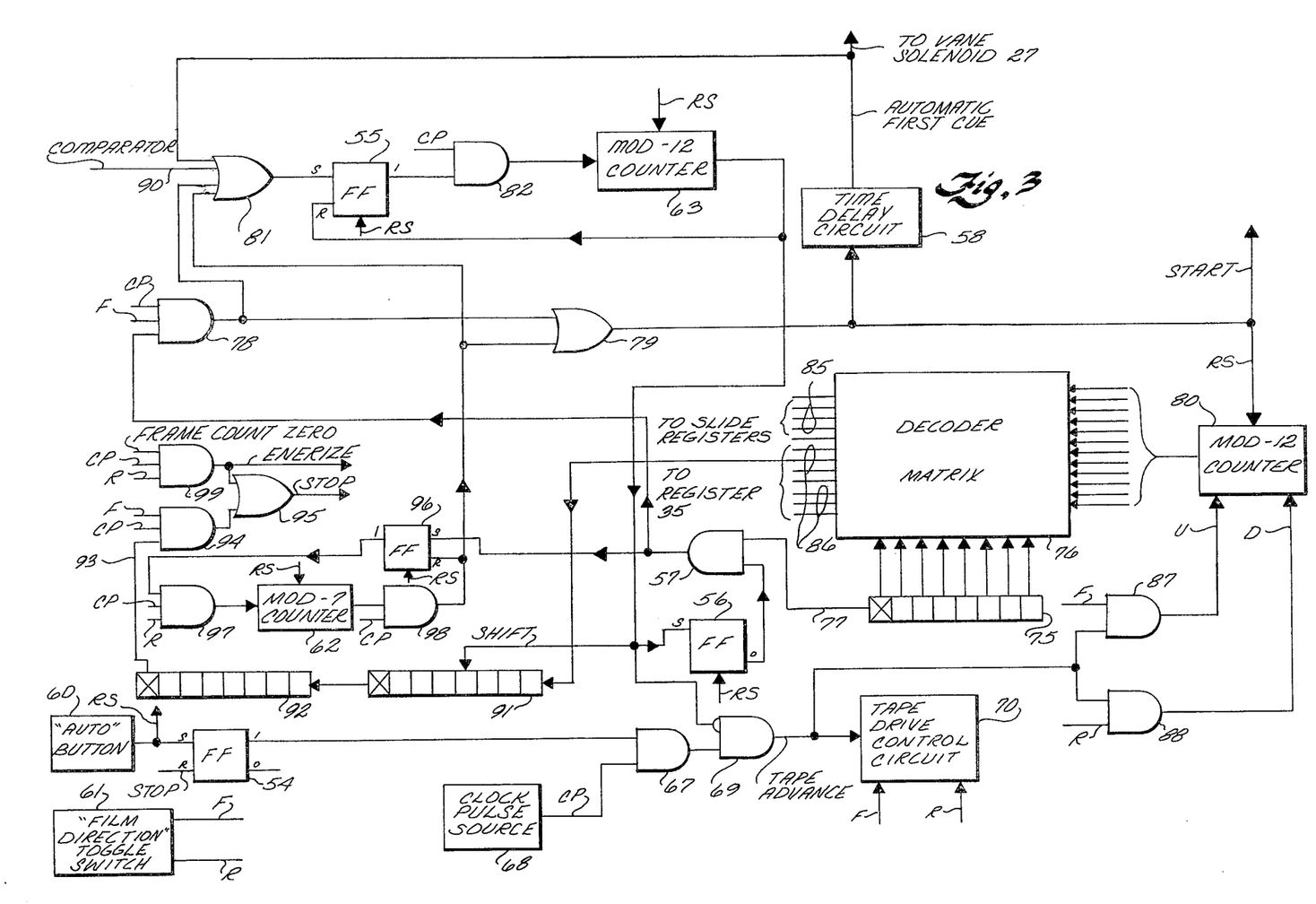
FIG. 3 is a schematic circuit diagram of the tape reader of FIG. 1.

FIG. 3 depicts tape reader 32 in detail, Preparatory to each pass of master film 14 in either direction of film transport, a "FILM DIRECTION" toggle switch 61 is placed in the position corresponding to the direction of film transport on the next pass and an "AUTO" button 60 is depressed. When toggle switch 61 is placed in the forward position, a lead F is energized and when it is placed in the reverse direction, a lead R is energized. Leads F and R are connected to switch control circuit 52 to close contact F during forward transport and contact R during reverse transport. When button 60 is depressed, a modulo-7 counter 62, a modulo-12 counter 63, and R-S flip-flops 55, 56, and 96 are reset, and an R-S flip-flop 54 is set, thereby energizing its "1" output. The 1 output of flip-flop 54 enables an AND gate 67, thereby permitting clock pulses from a clock pulse source 68 to be coupled via a lead CP through an inhibit gate 69 to the tape advance input of a tape drive control circuit 70. Control circuit 70 transports tape 31 in the forward or reverse direction depending upon whether lead F or lead R is energized. Each clock pulse from source 68 advances tape 31 one character position. The information stored in each character position is read in turn by reading head 34 and stored temporarily in a register 75.

During each reading cycle, the information in 12 character positions, i.e., one unit of color correction information and one unit of frame count information, is read sequentially from tape 31 into register 75. The first reading cycle is started responsive to the 8-hole in character position $\overline{B}_1$, the second reading cycle is started responsive to an automatic first cue generated a fixed time after the first reading cycle begins, and thereafter, one reading cycle follows the generation of each cue signal by comparator 41. The reading cycles of tape reader 32 are controlled by modulo-12 counter 63. A reading cycle is initiated each time a pulse is transmitted through an OR gate 81 to the set input of flip-flop 55, which energizes the 1 output of flip-flop 55. When the 1 output of flip-flop 55 is energized, clock pulses from lead CP are coupled through an AND gate 82 to the input of counter 63 to advance its state. After counter 63 advances 12 states, its output, which is connected to the reset input of flip-flop 55, is energized, and the 1 output of flip-flop 55 becomes deenergized. Thus, counter 63 stops counting until the next application of a pulse through OR gate 81 to the set input of flip-flop 55. The output of counter 63 is also coupled to the inhibit input of gate 69 to prevent further transmission of pulses through AND gate 67 to the tape advance input of tape drive control circuit 70.

The states of a modulo-12 counter 80 control the transmission of the information in the 12 character positions read during each reading cycle through a decoder matrix 76 to the appropriate registers in FIG. 1. Leads 85 are connected to the respective slide registers, one of which is slide register 51, and leads 86 are connected to shift register 35. Counter 80 is reversible.

During film transport in the forward direction, lead F is energized to enable an AND gate 87 and couple pulses from the output of AND gate 87 to an input U, which counts up the state of counter 80. As counter 80 counts up its leads connected to decoder matrix 76 are energized moving sequentially downward as viewed in FIG. 3, and the character information in register 75 is transferred to the output leads of decoder matrix 76, including leads 85 and 86, moving sequentially downward as viewed in FIG. 3. In summary, counter 80 controls decoder matrix 76 to transmit the color correction information to the slide registers and the frame count information to register 35.

In the reverse direction of film transport, the character positions on tape 31 pass head 34 in the opposite sequence. Thus, during film transport in the reverse direction, counter 80 is counted down to transmit the information in the character positions to the appropriate registers, namely, the color correction information to the slide registers and the frame count information to register 35. Lead R is energized to enable an AND gate 88 and transmit pulses from the output of AND gate 88 to an input U of counter 80, which counts down the state of counter 80. When counter 80 counts down, its leads connected to decoder matrix 76 are energized moving sequentially upward as viewed in FIG. 3 and the character information stored in register 75 is transferred to the output leads of decoder matrix moving sequentially upward as viewed in FIG. 3.

When AUTO button 60 is depressed, pulses are applied to the tape advance input of tape drive control circuit 70 to advance tape 31 in the forward direction until the 8-hole in character position $\overline{B}_1$ is sensed.

The 0 output of flip-flop 56 and a lead 77 from the stage of register 75 corresponding to channel 8 are connected to the inputs of an AND gate 57. Lead CP, lead F, and the output of AND gate 57 are connected to the inputs of an AND gate 78. When the 8-hole passes reading head 34, lead 77 is energized and a pulse is applied through AND gate 57, AND gate 78, and OR gate 81 to the set input of flip-flop 55 to begin the first reading cycle. This pulse is also applied through OR gate 79 to the reset input of counter 80 to synchronize decoder matrix 76 to the 8-hole, to the START lead of printer drive motor 21 (FIG. 1) to start film transport in the forward direction, and to a time delay circuit 58. The output of counter 63 is connected to the set input of flip-flop 56 to disable AND gate 57 at the end of the first reading cycle.

Time delay circuit 58, which could comprise a one shot multivibrator, produces an automatic first cue signal after a fixed time delay sufficient to insure the color correction information for the leader, $C_L$, has reached the slide registers. As with the subsequent cue signals generated by comparator 41, the automatic first cue signal is coupled to vane solenoid 27 (FIG. 1) and the vane solenoids for the other light valves to execute the color correction for the leader and is coupled through OR gate 81 to the set input of flip-flop 55 to start the second reading cycle. The second reading cycle places the frame count information for the first scene, $FC_1$, in register 36 and the remaining cue signals are generated by comparator 41 when the state of frame counter 39 matches the frame count in register 36. The 1 output of flip-flop 56 remains energized and thus AND gate 57 remains disabled until the beginning of the next pass in the reverse direction, at which time its reset lead is energized by depressing AUTO button 60.

After the second reading cycle, each time that comparator 41 generates a cue signal, it transmits a pulse via a lead 90 through OR gate 81 to the set input of flip-flop 55 to initiate another reading cycle. The reading cycles continue to be executed in sequence after each cue signal is generated by comparator 41 under the control of counters 63 and 80 and tape drive control circuit 70 in intermittent fashion while continuous film transport takes place until the end of the film and the stop cycle on tape 31 are reached.

During the stop cycle on tape 31, the zero cut information is transferred to the slide registers, and the information in the $10^1$ character position of the foot count, which is only the 8-hole, is coupled from register 75 through decoder matrix 76 to a shift register 91. When the state of frame counter 39 arrives frame count $FC_n$ indicating that the end of the last frame of master film 14 is passing exposure aperture 22, the zero cut information is transferred to vanes 25 so a final reading cycle is initiated in counter 63. When counter 63 finishes this final reading cycle, its output energizes a shift input to shift register 91, thereby shifting its contents including the 8-hole to a register 92. Lead CP, lead F and a lead 93 from the stage of register 92 corresponding to channel 8 of tape 31 are connected to the inputs of an AND gate 94. When the 8-hole is shifted to register 92, a pulse is transmitted through AND gate 94 and an OR gate 95 to the stop lead of printer drive motor 21 to stop film transport in the forward direction. This concludes the first pass of master film 14. Printer drive motor 21 and tape drive control circuit 70 remain inactive until the next pass of master film 14 in the reverse direction of film transport is initiated.

The stop lead is also connected to the reset input of flip-flop 54 to deenergize its one output and disable AND gate 67.

At this point, the exposed film is unloaded, a new raw film 17 is threaded into the printer for transport in the reverse direction, and toggle switch 61 is positioned to energize lead R. The energization of lead R readies control circuit 70 and printer drive motor 21 for operation in the reverse direction, and readies counter 80 for counting down. When AUTO button 60 is depressed, the next pass of master film 14 in the reverse direction of film transport is initiated.

When AUTO button 60 is depressed, counters 62 and 63 and flip-flops 55, 56 and 96 are reset and pulses are applied to the tape advance input of tape drive control circuit 70 to advance tape 31 in the reverse direction until the 8-hole in character position $10^1$ of the foot count is sensed. Lead 77 is connected through AND gate 57 to the set input of a flip-flop 96. The 1 output of flip-flop 96, lead CP, and lead R are connected to the inputs of an AND gate 97. When the 8-hole is sensed during transport of tape 31 in the reverse direction, pulses are coupled through AND gate 97 to advance counter 62 seven states. During this time, tape 31 is advancing from character position $10^1$ of the foot count to character position $\overline{B}_1$, as illustrated in the lower right-hand corner of FIG. 2. This places tape 31 at the starting position for the first reading cycle in the reverse direction of transport. After counter 62 advances through seven states, it enables an AND gate 98 to couple a pulse through OR gate 81 to flip-flop 55 to start the first reading cycle and through OR gate 79. A pulse is also coupled by AND gate 98 to the reset lead of flip-flop 96, thereby disabling AND gate 97 and the operation of counter 62. As described above in connection with the operation in the forward direction, counter 80 is reset, printer drive motor 21 starts, and after a delay an automatic first cue signal is generated to start the second reading cycle.

Thereafter, after each cue signal generated by comparator 41, counter 63 advances twelve states to execute another reading cycle while continuous film transport in the reverse direction takes place. This operation continues until the state of frame counter 39 indicates a zero foot and frame count. A frame count zero lead is connected from frame counter 39 to an AND gate 99. When the state of frame counter 39 indicates a zero foot and frame count, lead frame count "0" is energized and a pulse is transmitted through OR gate 95 to the stop lead of printer drive motor 21 and directly to vane solenoid 27 to transmit a zero cut to vanes 25, thereby shutting off the light to the film. Thus, in reverse transport, there is an $n + 2$nd cycle (not shown in FIG. 4), in which zero cut information is read from tape 31. Operation in the reverse direction is terminated responsive to the indication that frame counter 39 is at a zero foot and frame count. This concludes the first pass of master film 14 in the reverse direction. To print more copies of master film 14, passes in the forward and reverse direction are carried out in the described manner until the desired number of copies are produced. Before each pass, toggle switch 61 is positioned and AUTO button 60 is depressed to initiate the operation.

Figure 4:
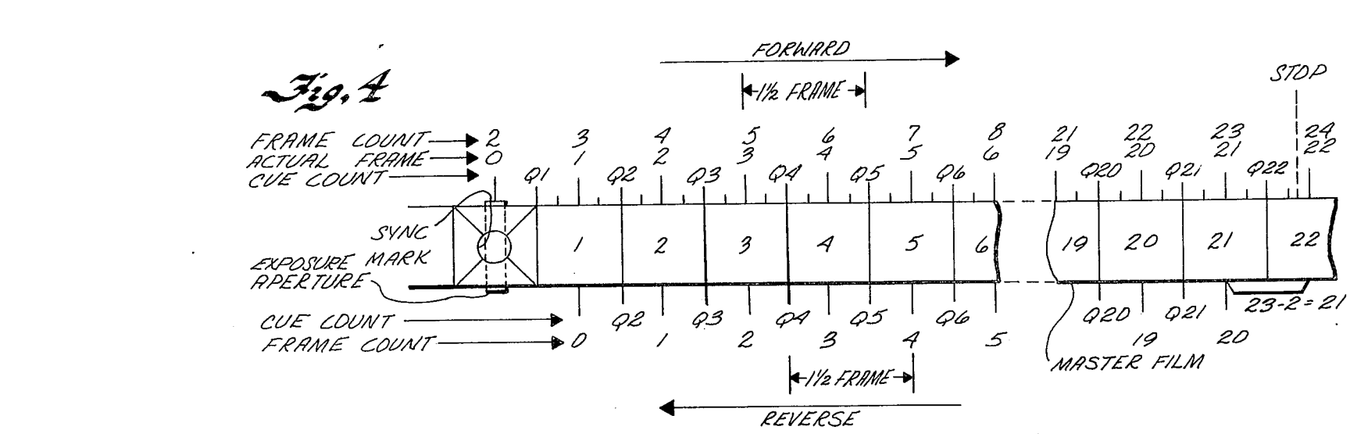
FIG. 4 is a diagram depicting the relationship between the cue count of the master film and the frame count in each direction of film transport.

Frame counter 39 is preset before film transport in both directions so the cue signal is actually generated by comparator 41, 1½ frames before the point on master film 14 at which the color correction is to be made reaches exposure aperture 22. This anticipation compensates for the inherent delay in the response of vanes 25 to the application of the cue signal to vane solenoid 27 so as to execute the color correction precisely at the edge of the frame at the beginning or end of the scene, depending upon the direction of film transport. Depending upon the circumstances the anticipation could be fewer or more frames. For example with 16mm film, the anticipation would be more frames, e.g. 7-½, or at a higher film speed the anticipation could be more frames. Reference is made to FIG. 4 for a description of the technique for anticipating the color corrections. Twenty-two scenes are represented on the master film. For convenience, each scene is shown as comprising one frame although in reality each scene would comprise many frames. The cue counts, Q1, Q2, etc., represent the frames at which the color corrections are to be executed. When threading the master film on the film printer preparatory to operation, a sync mark on the leader of the master film is aligned with the exposure aperture. This sync mark is the reference point with respect to which the frames of the master film are counted in both directions of film transport. This position of the master film in the film printer is precisely determined and accurately reflected by the state of frame counter 39. Since the sync mark is located with respect to the center of the frames on the master film, as illustrated in FIG. 4, the actual frame of the master film and the frame count indicated by the state or counter 39 proceed from the center of each frame. The cue count proceeds from the beginning of the first frame of each scene. Thus, assuming each scene has one frame, cue count Q2 for scene 2 proceeds from the beginning of the second frame of the master film, i.e., one-half frame ahead of actual frame two. Preparatory to film transport in the forward direction the first time after the master film is threaded in the printer frame counter 39 is preset to a state of 000 feet, two frames, so the frame count indicated by frame counter 39 is two frames ahead of the actual frame. During film transport in the forward direction, the state of counter 39 is counted up as each frame passes exposure aperture 22. Thus, at actual frame 0 the aperture is aligned with the sync mark and the frame count indicated by counter 39 is two; at actual frame four, the frame count indicated by counter 39 is six, etc. The frame count indicated by counter 39 is 1-½ frames ahead of the cue count.

Preparatory to film transport in the reverse direction, frame counter 39 is preset by subtracting two frames from the state of frame counter 39 after film transport in the forward direction has terminated. Thus, assuming the master film stops before the middle of actual frame 22 at the end of film transport in the forward direction, the frame count indicated by frame counter 39 is 23 (or more correctly, 1 ft., 7 frames). Before film transport in the reverse direction, two frames are subtracted from the state of counter 39 leaving a frame count of 21. During subsequent film transport in the reverse direction, the state of frame counter 39 is counted down as each frame passes exposure aperture 22, and the frame count indicated by frame counter 39 is 1-½ frames ahead of the cue count.

Preparatory to the next film transport in the forward direction, frame counter 39 is preset by adding two frames from the state of frame counter 39 after film transport in the reverse direction is terminated.

Figure 5:
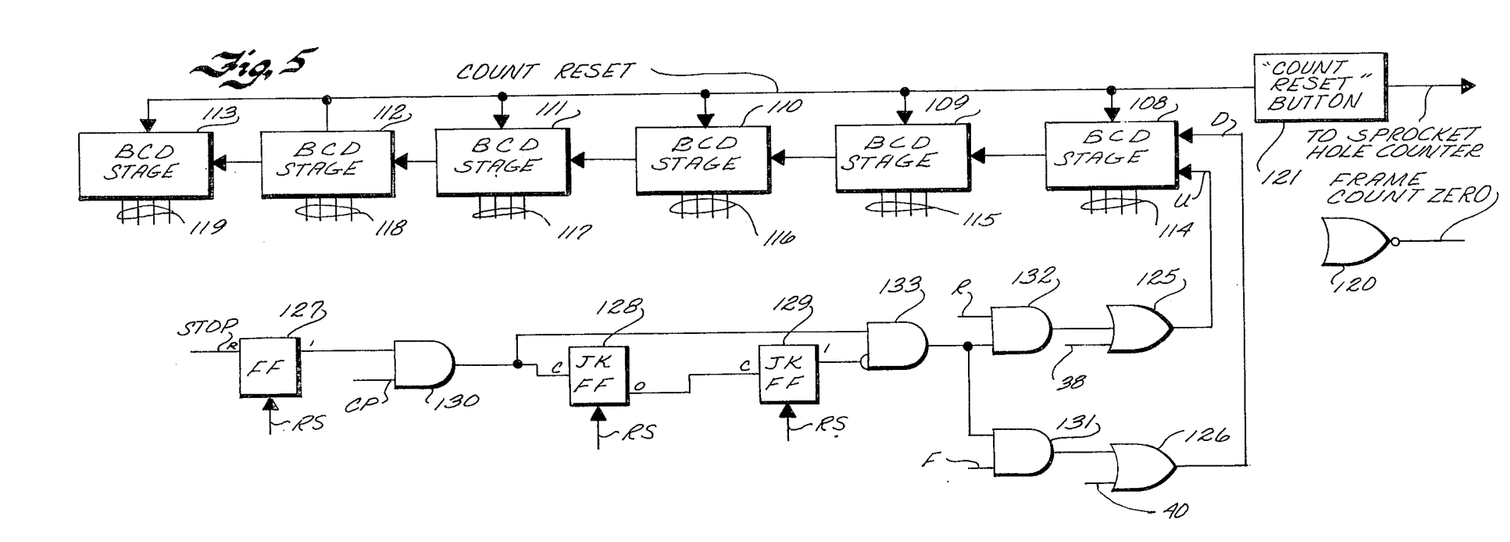
FIG. 5 is a schematic circuit diagram of the frame counter of FIG. 1.

As depicted in FIG. 5, frame counter 39 comprises binary decimal counter stages 108 and 109, which indicate the $10^0$ and $10^1$ digit places, respectively, of the frames and binary decimal counter stages 110, 111, 112, and 113, which indicate the $10^0$, $10^1$, $10^2$, and $10^3$ digit places, respectively, of the foot count. Stages 108 through 113 are serially connected and have output leads 114, 115, 116, 117, 118, and 119, respectively, which are coupled to comparator 41, and the inputs of a NOR gate 120. The output of NOR gate 120, which is energized when stages 110 through 114 are all in the 0 state, is connected to the frame count zero lead. A count reset button 121 is depressed after threading a new master film in the printer and before the first pass, to place stages 109 through 113 in the 0 state, and stage 108 in the stage indicating a frame count of two. Count reset button 121 is not depressed again during any of the subsequent passes of the master film so the known fixed relationship of the master film to exposure pattern 22 set up initially by aligning the aperture at the beginning of master film 14 with the sync mark of the printer (FIG. 4) is retained as the copies of the master film are produced during alternate forward and reverse film transport. When a new master film is threaded in the printer with its aperture in alignment with the sync mark of the printer, button 121 is again depressed. As previously stated in connection with FIG. 4, after each pass in the forward direction two counts are subtracted from the state of frame counter 39, and after each pass in the reverse direction two counts are added to the state of frame counter 39. The pulses from lead 38 generated by frame sensor 37 (FIG. 1) are coupled through an OR gate 125 to a lead U of stage 108 to count up its state. Pulses from lead 40 are coupled through OR gate 126 to a lead D of stage 110 to count down its state. Thus, the state of counter 39 indicates the frame of master film 14 that is currently located at exposure aperture 22 at all times irrespective of the direction and extent of prior film transport. Flip-flops 127, 128, and 129 are reset at the beginning of each pass responsive to AUTO button 60. The stop lead from the output of OR gate 95 (FIG. 3) is connected to the set input of flip-flop 127. The 1 output of flip-flop 127 is connected to the input of an AND gate 130 to enable it when a pulse appears on the stop lead. During film transport in the forward direction, lead F enables an AND gate 131, and during film transport in the reverse direction, lead R enables an AND gate 132. When film transport in the forward direction stops, one clock pulse is transmitted through an inhibit gate 133, AND gate 131, and OR gate 126 to input D of stage 108 so as to count down its state, and is coupled to flip-flop 128 to energize its 1 output. The 0 output of flip-flop 128 is connected to the clock input of flip-flop 129, the output of which is connected to the inhibit input of gate 133. The second clock pulse passing through AND gate 130 is also transmitted through inhibit gate 133, AND gate 131, and OR gate 126 to input D of stage 108 to count down its state, and is coupled to flip-flop 128 to energize its 0 output. This energizes the 1 output of flip-flop 129 to inhibit any further passage of pulses through gate 133. In summary, at the end of each pass of the master film in the forward direction, two clock pulses are applied to input D to count counter 39 down two states. Similarly, at the end of each pass of master film 14 in the reverse direction, two clock pulses are transmitted through inhibit gate 133, AND gate 132, and OR gate 125 to input U of stage 108 to count counter 39 up two states. Thus, the anticipation described in connection with FIG. 4 is achieved by the implementation of frame counter 39 disclosed in FIG. 5.

Figure 6:
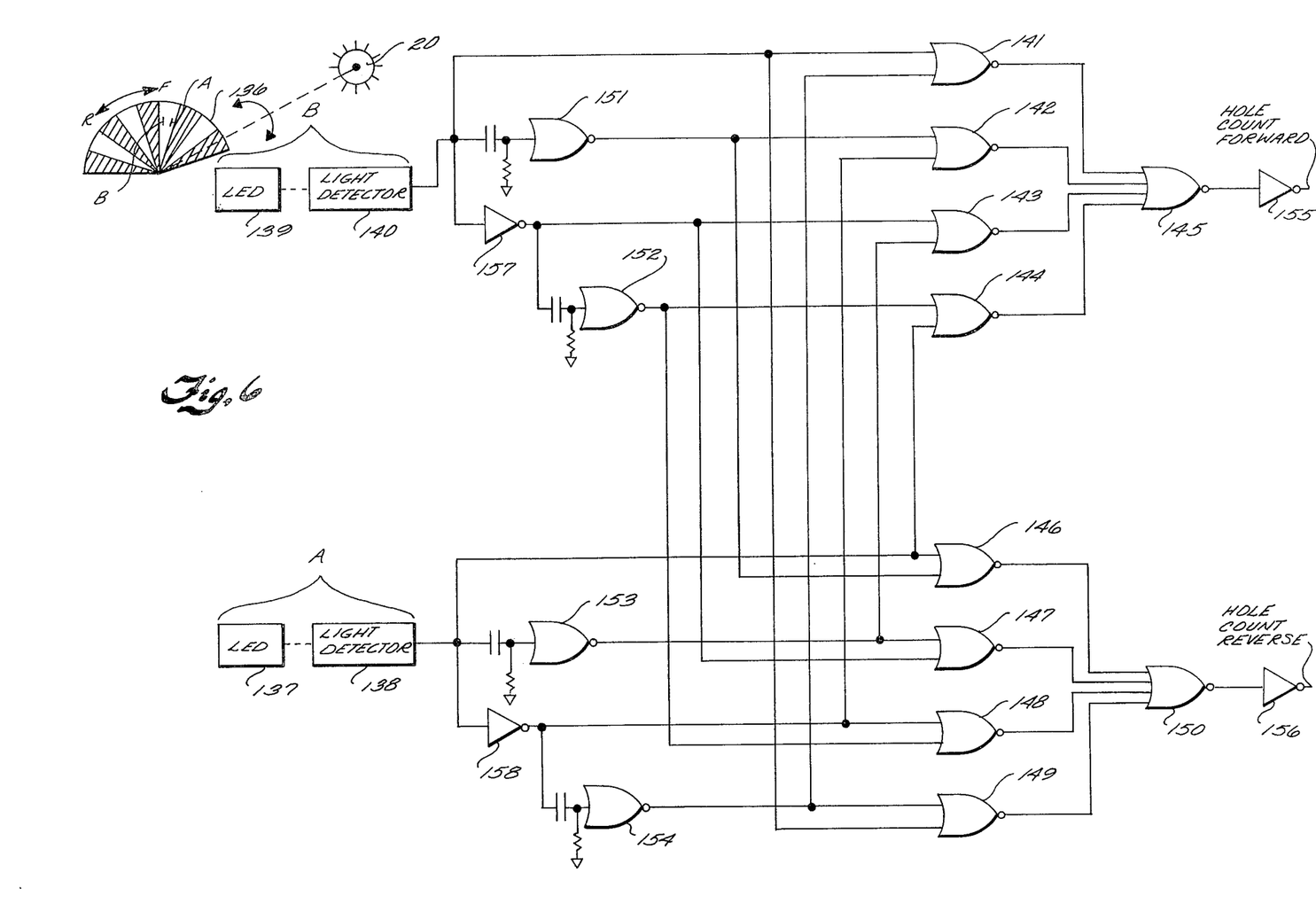
FIGS. 6 and 7 are schematic circuit diagrams of apparatus for sensing the frames of the master film during bidirectional film transport.
Figure 7:
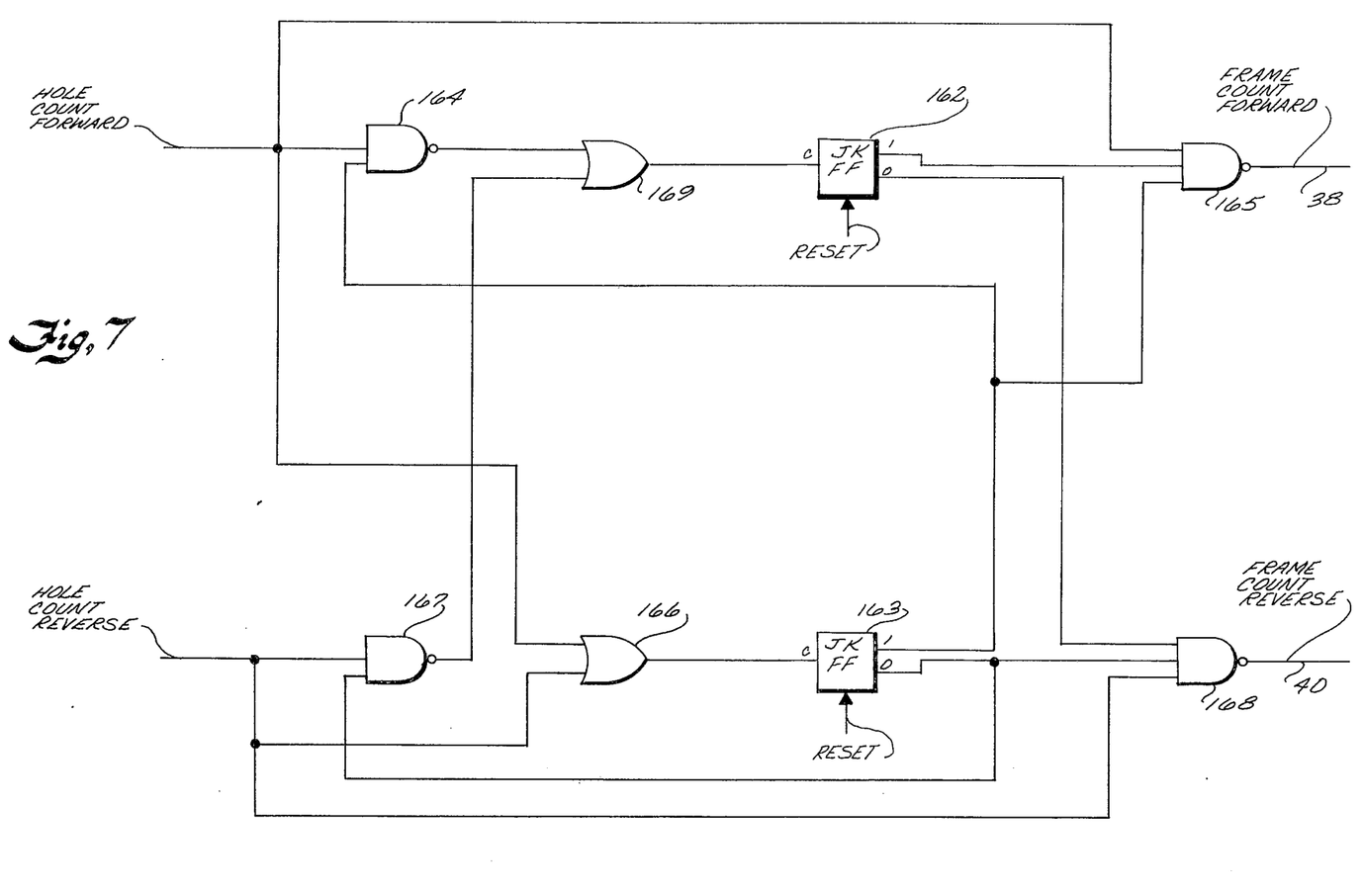

Reference is made to FIGS. 6 and 7 for a detailed description of frame sensor 37. As illustrated in FIG. 6, a disc 136 having alternate opaque and transparent arc segments is mechanically coupled by a shaft to sprocket wheel 20. The number of transparent segments (and thus the number of opaque segments also) equals the number of sprockets on wheel 20. A light emitting diode 137 and a light detector 138 are aligned with each other on opposite sides of the periphery of disc 136 at a relative position designated A. Similarly, a light emitting diode 139 and a light detector 140 are aligned with each other on opposite sides of the periphery of disc 136 at a relative position designated B. A and B are spaced apart such that the angle they form with the center of disc 136 equals one-half the angle of each arc segment on disc 136. As illustrated by the arrow, disc 136 rotates in one direction during forward film transport and rotates in the other direction during reverse film transport. While one of the light detectors is receiving light from its light emitting diode, i.e., a transparent arc segment of disc 136 is passing between such light emitting diode and light detector, the output of the light detector is energized. When an opaque arc segment of disc 136 is passing between a light diode and its light detector, the output of the light detector is not energized. As disc 136 rotates, light detectors 138 and 140 each alternately become energized and deenergized to form square waves at their outputs. During forward film transport, the square wave from light detector 140 leads the square wave from light detector 138 in phase by 90°; during reverse film transport, the square wave from light detector 138 leads the square wave from light detector 140 in phase by 90°. Responsive to the outputs of light detectors 138 and 140, NOR gates 141 through 154 produce a pulse at the output of a phase inverter 155 each time master film 14 is transported one sprocket hole in the forward direction and produce a pulse at the output of an inverter 156 each time master film 14 is transported one sprocket hole in the reverse direction. The output of light detector 140 is directly connected to one input of NOR gate 141 and to one input of NOR gate 149, and is connected through an inverter 157 to one input of NOR gate 143 and one input of NOR gate 147. The output of light detector 140 is also differentiated by a capacitor-resistor network at the input of NOR gate 151 and connected therethrough to one input of NOR gate 142 and one input of NOR gate 146. The output of inverter 157 is also differentiated by a capacitor-resistor network at the input of NOR gate 152 and connected therethrough to one input of NOR gate 144 and one input of NOR gate 148. The outputs of NOR gates 141 through 144 are connected to the inputs of NOR gate 145, the output of which is connected to inverter 155.

Similarly, the output of light detector 138 is directly connected to one input of NOR gate 146 and one input of NOR gate 144 and is connected through an inverter 158 to one input of NOR gate 148 and one input of NOR gate 142. The output of light detector 138 is also differentiated by a capacitor-resistor network at the input of NOR gate 153 and connected therethrough to one input of NOR gate 147 and one input of NOR gate 143. The output of inverter 158 is also differentiated by a capacitor-resistor network at the input of NOR gate 154 and connected therethrough to one input of NOR gate 149 and one input of NOR gate 141. The outputs of NOR gates 146 through 149 are connected to the inputs of NOR gate 150, the output of which is connected to inverter 156.

The described logic implemented by NOR gates 141 through 154 and inverters 157 and 158 produces a hole count pulse at the output of inverter 155 each time master film 14 is transported one sprocket hole in the forward direction, and produces a hole count pulse at the output of inverter 156 each time master film 14 is transported one sprocket hole in the reverse direction.

In FIG. 7, logic is disclosed which permits RS flip-flops 162 and 163 to operate as a modulo-4 counter in response to the hole count pulses for both directions of film transport, to provide a frame count pulse for each four hole count pulses. The output of inverter 155 is connected to one input of a NAND gate 164, one input of a NAND gate 165, and one input of an OR gate 166. The output of inverter 156 is connected to one input of a NAND gate 167, one input of a NAND gate 168, and one input of OR gate 166. The outputs of NAND gates 164 and 167 are connected to the inputs of an OR gate 169, the output of which is connected to the clock input of flip-flop 162. The output of OR gate 166 is connected to the clock input of flip-flop 163. The 1 output of flip-flop 162 is connected to one input of NAND gate 165, and the 0 output of flip-flop 162 is connected to one input of NAND gate 168. The 1 output of flip-flop 163 is connected to one input of NAND gate 164 and one input of NAND gate 165. THe 0 output of flip-flop 163 is connected to one input of NAND gate 167 and one input of NAND gate 168. During forward film transport, the described logic interconnects flip-flops 163 and 162 to function respectively as the first and second stages of the modulo-4 counter, so a pulse appears on lead 38 at the output of NAND gate 165 after each four hole count pulses at the output of inverter 155. Similarly, during reverse film transport, the described logic interconnects flip-flops 162 and 163 to function respectively as the first and second stages of the modulo-4 counter so a pulse appears on lead 40 at the output of NAND gate 168 after each four hole count pulses at the output of inverter 156. Flip-flops 162 and 163 are reset responsive to count reset button 121 (FIG. 5) at the time the master film is first threaded into the printer and after the aperture of the master film is aligned with the sync mark of the printer, as described in connection with FIG. 4, thereafter flip-flops 162 and 163 are not reset during the subsequent passes of the same master film in which copies thereof are produced. As a result, the frame count pulses are precisely aligned with the center of each frame of master film 14 without having to index the periphery of sprocket wheel 20 and remain so aligned throughout the coping of each master film.

One particularly useful application of the invention is as a modification kit to the Bell & Howell Model C Contact Printer to convert this printer from a single direction printer to a bidirectional printer and, if desired, to frame count cuing operation. However, it should be pointed out that some of the principles of the invention can be practiced without frame count cuing; the frames of the master film at which the light control operations are to be executed can be indicated by notches on the master film or RF strips. Similarly, some aspects of the invention can be employed to execute other light control operations such as a fade.

Reference is made to my co-pending application Ser. No. 558,537, filed on even date herewith entitled "APPARATUS FOR DETECTING A MALFUNCTION IN A COLOR CORRECTING LIGHT VALVE OF A FILM PRINTER", assigned to the same assignee as the present application, the disclosure of which is incorporated herein by reference. A stop signal from the comparator disclosed in FIG. 1 of that application could also be coupled through OR gate 95 to printer drive motor 21 in order to stop printer operation when a malfunction occurs in one of the light valves.

The described embodiment of the invention is only considered to be preferred and illustrative of the inventive concept; the scope of the invention is not to be restricted to such embodiment. Various and numerous other arrangements may be devised by one skilled in the art without departing from the spirit and scope of this invention. For example, some features of the invention can be practiced with notches or RF strips providing the frame indications of color corrections rather than frame count cuing, with frame counting relative to the last color correction rather than relative to a point at the beginning of the master film, or with fades as the light control operations rather than color corrections.

What is claimed is:

1. A bidirectional film printer comprising:
   means for selectively transporting a length of master film and a length of raw film past a point of exposure in either a forward or a reverse direction;
   means for projecting light through the master film onto the raw film at the point of exposure;
   means for counting the frames of the master film during transport;
   tape storage means along which units of light control information and units of frame count information indicating the frame count of the master film where such light control information is to be used are stored in the sequence in which the units of light control information are to be used during film transport;
   means for selectively transporting the tape storage means in a forward direction to retrieve the units of information in the order that they are to be used in the forward direction of film transport and for transporting the tape storage means in a reverse direction to retrieve the units of information in the order in which they are to be used in the reverse direction of film transport;
   means for controlling the light projected through the master film;
   means for retrieving from the tape storage means one unit of light control information and one unit of frame count information in the same pairs in both directions of tape transport;
   first means for transmitting the units of light control information to the light controlling means;
   a comparator;
   second means for transmitting the frame count indicated by the frame counting means to the comparator; and
   third means for transmitting the units of frame count information to the comparator for comparison with the frame count indicated by the frame counting means, one of the transmitting means including means for delaying the units transmitted thereby in one direction of film transport one light control operation relative to the units transmitted thereby in the other direction of film transport.

2. The apparatus of claim 1, in which the light controlling means comprises a plurality of light valves through which respective color components of the light pass, the light valves each having vane means positionable to vary the intensity of the light component passing therethrough, a slide register, slide actuating solenoids, and a vane solenoid actuated responsive to the comparator when the frame count indicated by the frame counting means matches the units of frame count information transmitted to the comparator by the third transmitting means.

3. The apparatus of claim 2, in which the first transmitting means comprises means for transmitting the units of light control information directly to the slide register during film transport in one direction, a shift register, means for transmitting the units of light control information to the shift register, and means during film transport in the other direction for shifting the units stored in the shift register to the slide register.

4. The apparatus of claim 2, in which the third transmitting means comprises a first shift register for receiving the retrieved units of frame count information, a second register whose contents is transmitted to the comparator, and means responsive to the comparator for shifting units of information in the first register to the second register.

5. The apparatus of claim 4, in which the first transmitting means comprises means for transmitting the units of color correction information directly to the slide register during film transport in one direction, a third shift register, means for transmitting the units of color correction information to the third shift register, and means during film transport in the other direction for shifting the units stored in the third shift register to the slide register.

6. Apparatus for use with a film printer that executes prescribed color corrections during bidirectional transport of a master film and a raw film to transfer to the raw film frames of photographic images on the master film, units of color correction information each representing one of the prescribed color corrections to be executed during printing being arranged in data storage means in the sequence in which the prescribed color corrections are to be executed in one direction of film transport and units of frame count information each representing the frame at which a corresponding prescribed color correction is to be executed during printing in the one direction of film transport being interleaved in the data storage means with the corresponding units of color correction information, the apparatus comprising:
   means responsive to a cue signal for executing a color correction responsive to a unit of color correction information supplied thereto;
   means for counting the frames of the master film during film transport;
   first means for retrieving each unit of frame count information from the data storage means in the order of the sequence during film transport in the one direction;
   means for comparing the frames counted by the counting means with each unit of frame count information retrieved by the first retrieving means to generate a cue signal during film transport in the one direction;
   second means for retrieving each unit of color correction information from the data storage means in the order of the sequence during film transport in the one direction and supplying such unit of color correction information to the color correction executing means, the first and second retrieving means retrieving the units of color correction information and the units of frame count information in pairs during the film transport in the one direction;

third means for retrieving each unit of frame count information from the data storage means in the reverse order of the sequence during film transport in the other direction;

means for comparing the frames counted by the counting means with each unit of frame count information retrieved by the third retrieving means to generate a cue signal during film transport in the other direction;

fourth means for retrieving each unit of color correction information from the data storage means in the reverse order of the sequence during film transport in the other direction and supplying such unit of color correction information to the color correction executing means, the third and fourth retrieving means retrieving the units of color correction information and the units of frame count information in the same pairs during film transport in the other direction as the first and second retrieving means in the one direction; and means for supplying the cue signals generated by the comparing means and the units of color correction information retrieved by the second and fourth retrieving means to the color correction executing means in the proper sequence for executing the prescribed color corrections during film transport in both directions.

7. The apparatus of claim 6, in which the retrieving means include means for delaying transmission of one unit of each pair during film transport in one direction of film transport relative to the other direction such that the cue signal to execute each color correction during film transport in the one direction is generated responsive to the corresponding frame court and the cue signal to execute each color correction during film transport in the other direction is generated responsive to the frame count corresponding to the next subsequent color correction in the order of the sequence.

8. The apparatus of claim 7, in which the one direction is the forward direction and the other direction is the reverse direction of film transport, the pairs each comprise a unit of color correction information and a unit of frame count information indicating the frame of the master film at which the next subsequent color correction is to be executed in the order of the sequence during film transport in the forward direction, the first retrieving means including a first shift register into which each unit of frame count information is transferred in turn and a second shift register into which each unit of information stored in the first shift register is shifted when the next unit of frame count information is transferred into the first shift register, the comprising means comparing the unit of frame count information stored in the second shift register with the frames counted by the counting means, and the means for delaying transmission comprises a third shift register into which each unit of color correction is transferred in turn in the reverse direction of film transport.

9. The apparatus of claim 8, in which the first retrieving means retrieves each unit of frame count information responsive to the cue signal generated responsive to the preceding frame count in the order of the sequence during film transport in the one direction and the third retrieving means retrieves each unit of frame count information responsive to the cue signal generated responsive to the preceding frame count in the reverse order of the sequence during film transport in the other direction.

10. The apparatus of claim 9, in which the units of frame count information each represent the frame relative to the same reference point at one end of the master film and the counting means counts the frames continuously relative to said same reference point in both directions of film transport.

11. The apparatus of claim 10, additionally comprising means for transporting the master film and the raw film in both directions of film transport, means for stopping film transport at the end of the master film opposite said reference point responsive to an indication in the storage means, and means for stopping film transport at the same end of the master film as said reference point responsive to the counting means when said reference point on the master film is reached.

12. The apparatus of claim 6, in which the first retrieving means retrieves each unit of frame count information responsive to the cue signal generated responsive to the preceding frame count in the order of the sequence during film transport in the one direction and the third retrieving means retrieves each unit of frame count information responsive to the cue signal generated responsive to the preceding frame count in the reverse order of the sequence during film transport in the other direction.

13. The apparatus of claim 6, in which the units of frame count information each represent the frame relative to the same reference point at one end of the master film and the counting means counts the frames continuously from said same reference point in both directions of film transport.

14. The apparatus of claim 13, additionally comprising means for transporting the master film and the raw film in both directions of film transport, means for stopping film transport at the end of the master film opposite said reference point responsive to an indication in the storage means, and means for stopping film transport at the same end of the master film as said reference point responsive to the counting means when said reference point on the master film is reached.

* * * * *